May 31, 1949.  O. O. OAKS  2,471,538
APPARATUS FOR HEATING AND COOLING KETTLES
Filed Sept. 16, 1947
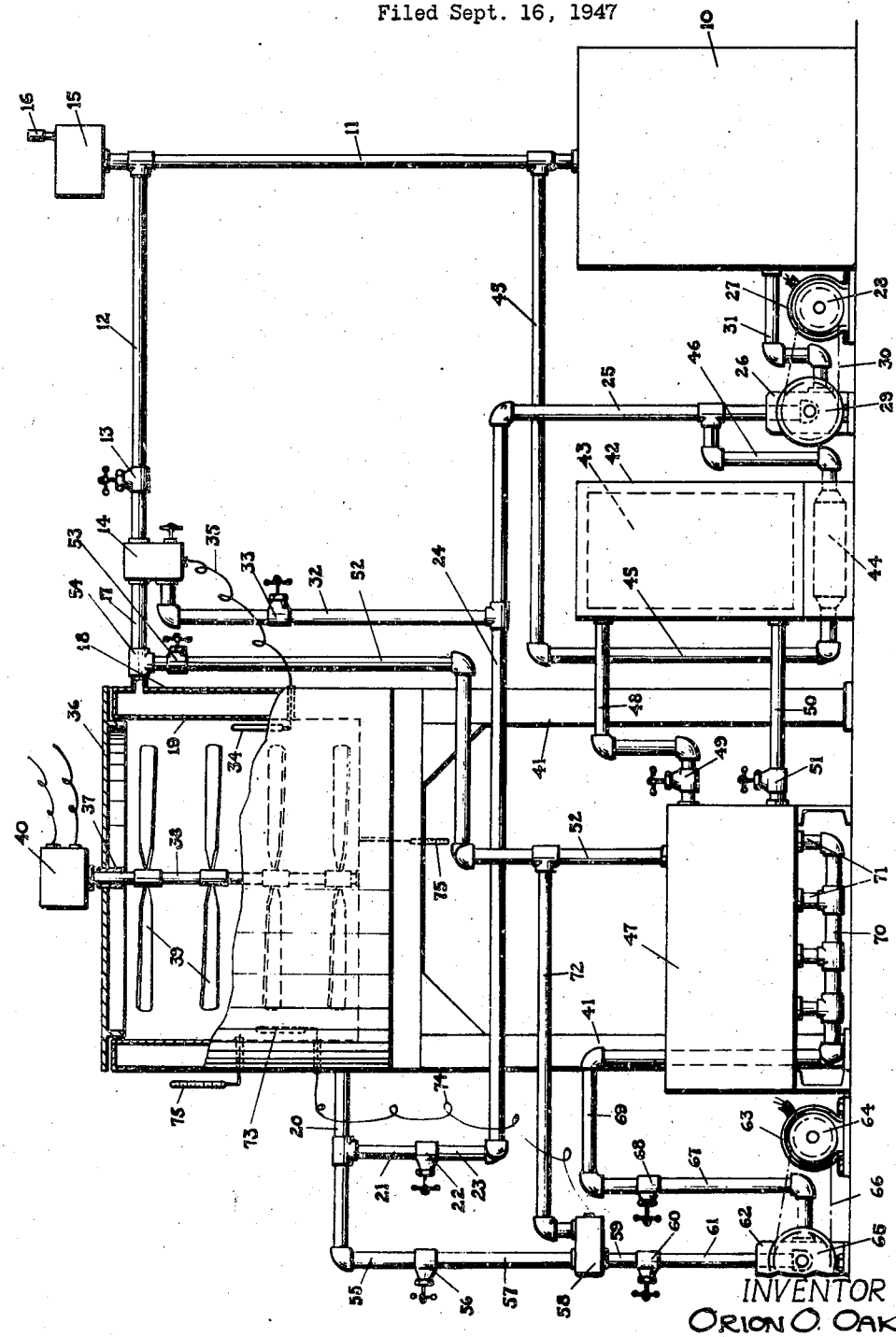
INVENTOR
ORION O. OAKS
BY
Cameron, Kerkam, & Sutton
Attorneys Patented May 31, 1949

2,471,538

UNITED STATES PATENT OFFICE 2,471,538

APPARATUS FOR HEATING AND COOLING KETTLES

Orion Ottis Oaks, Summit, N. J., assignor, by mesne assignments, to Thermal Liquids, Inc., New York, N. Y., a corporation of Delaware Application September 16, 1947, Serial No. 774,378

1 Claim. (Cl. 257—4)

This invention relates to the heating and cooling of mixing kettles and the like and more particularly to a system and apparatus for such heating and cooling employing a particular class of chemical compounds, the tetra-aryl ortho silicates, as the heat transfer medium.

The tetra-aryl ortho silicates are described in the Johnston Patent No. 2,335,012, dated November 23, 1943. These compounds boil in the neighborhood of 600° F. and may still be circulated at −60° F. Within this temperature range these compounds are an excellent heat transfer medium.

In many industries including the paint and varnish industry it is desirable to heat materials in a process of manufacture to a certain temperature and thereafter to rapidly cool the same below this temperature to prevent undesirable reactions either from excessive temperatures or from chemical side reactions engendered by such temperatures. Heretofore this problem has been met either by the use of complicated, inefficient and expensive apparatus or by time consuming and expensive step by step heating procedures whereby the desired temperature is reached in heating stages. All of these methods result in harmful deterioration of the end product and waste of substantial amounts of the basic materials.

Most, if not all, of these difficulties are overcome by the heating and cooling system and by the apparatus employed in the present invention.

It is accordingly an object of the present invention to provide a novel system and apparatus for the heating of kettles to desired temperatures and for the efficient and prompt cooling of such kettles after these temperatures have been reached.

Another object is to provide such a system and apparatus in which a particular class of chemical compounds, the tetra-aryl ortho silicates, are used as the heat transfer medium.

Another object is to provide such a system in which the tetra-aryl ortho silicates are used not only to heat the kettle but to cool the kettle.

Another object is to provide such a system and apparatus in which heat losses are reduced to a minimum.

Another object is to provide such a system and apparatus which is of simple and inexpensive construction and readily operated by inexperienced personnel.

This invention is capable of many mechanical expressions and one embodiment thereof is shown on the accompanying drawing and is described hereinafter to illustrate the invention. This should in no way be construed as defining or limiting the invention and reference should be had to the appended claims for this purpose.

In the drawing, 10 is any suitable boiler for heating tetra-aryl ortho silicate. Boiler 10 may use coal, gas, oil, electricity or any other suitable fuel. Heated tetra-aryl ortho silicate is taken from boiler 10 by pipes 11 and 12 through manually operable valve 13 and thermostatically controlled valve 14. Since the system of the present invention is preferably, though not necessarily, a closed system it is desirable to provide the system with an expansion tank 15 to compensate for the expansion and contraction of the tetra-aryl ortho silicate during heating and cooling. Tank 15 is in communication with pipe 11 and may be provided with a suitable pressure and vacuum responsive relief valve 16 opening thereinto. Valve 16 is normally closed and opens only when abnormal and undesirable conditions of pressure or vacuum exist in the system.

Pipe 17 leads from thermostatically controlled valve 14 and communicates with the interior of the jacket 18 of jacketed kettle 19. Tetra-aryl ortho silicate is removed from jacket 18 by pipes 20, 21, 23, 24 and 25, a manually operable valve 22 being connected between pipes 21 and 23. Pipe 25 communicates with the intake side of a suitable pump 26 driven by motor 27 through pulleys 28 and 29 and belt 30. The exhaust side of pump 26 is connected to the return side of boiler 10 by pipe 31.

Thermostatically controlled valve 14 is provided with a by-pass pipe 32 connecting into pipe 24 and provided with manually operable valve 33. Valve 14 is subject to the temperatures of the contents of kettle 19 and is actuated by a conventional bulb 34 mounted in kettle 19 and communicating with valve 14 through tubing 35.

Kettle 19 may be provided, when desired, with any suitable top 36 provided with a bearing 37. Bearing 37 supports shaft 38 which carries one or more mixing paddles 39. Shaft 38 and paddles 39 may be rotated by any suitable motor 40.

Kettle 19 may also be provided with suitable supporting means such as legs 41.

Conveniently arranged with respect to boiler 10 is a conventional absorption type refrigerating unit 42 provided with a reservoir 43 for cooled tetra-aryl ortho silicate and with a conventional generator seen diagrammatically at 44. Generator 44 is connected into pipe 11 carrying heated tetra-aryl ortho silicate by pipe 45 and is connected to the intake side of pump 26 by pipe 46. A supply tank 47 for cooled tetra-aryl ortho silicate communicates with reservoir 43 through pipe 48 and manually operable valve 49 and returns tetra-aryl ortho silicate to be cooled to reservoir 43 by pipe 50 and manually operable valve 51.

Cooled tetra-aryl ortho silicate is taken from tank 47 by pipe 52 through manually operable valve 53 and is admitted to the interior of jacket 18 by connecting pipe 52 to pipe 17 at 54. Cooled tetra-aryl ortho silicate is removed from jacket 18 through pipe 20, pipe 55, manually operable valve 56, pipe 57, thermostatically controlled valve 58, pipe 59, manually operable valve 60 and pipe 61 to the intake side of a suitable pump 62. Pump 62 is driven by motor 63, pulleys 64 and 65 and belt 66. The exhaust side of pump 62 is connected by pipe 67, manually operable valve 58 and pipe 69 to a suitable leader 70 opening through a plurality of connections 71 to the interior of tank 47.

Thermostatically controlled valve 58 is provided with a by-pass pipe 72 connecting into pipe 52. Valve 58 is subject to temperatures within kettle 19 and is actuated by a conventional bulb 73 mounted in kettle 19 and connected to valve 58 by tubing 74.

Temperatures within kettle 19 may be visibly indicated by thermometers 75.

With the system and apparatus of my invention set up as above described when it is desired to use the same for heating the contents of kettle 19 to a desired temperature and thereafter to rapidly cool the same valve 14 is set for the desired temperature of heating and valve 58 is set for the lowest temperature desired for cooling. Valve 13 is opened, valve 53 is closed, valve 22 is opened and valve 56 is closed, boiler 10 is fired and motor 27 and pump 26 are started. Heated tetra-aryl ortho silicate is then circulated by pump 26 from boiler 10 through pipes 11 and 12, valve 14 and pipe 17 through jacket 18 and returned to boiler 10 through pipes 20 and 21, valve 22, pipes 23, 24 and 25, pump 26 and pipe 31. Kettle 19 and its contents are thus heated with stirring when desired by the rotation of paddles 39 up to the temperature for which valve 14 is preset. When this temperature is reached bulb 34 actuates valve 14 to close pipe 17 and open by-pass 32, by-passing heated tetra-aryl ortho silicate around jacket 18 and back to pump 26. By-pass 32 remains open until the temperature of the contents of kettle 19 drops below that for which valve 14 is preset. At that time bulb 34 actuates valve 14 to close by-pass 32 and to open pipe 17. A close control of the temperature of the contents of kettle 19 is thus obtained.

While pump 26 is circulating heated tetra-aryl ortho silicate through jacket 18 it is also circulating it through pipe 45 and generator 44 of refrigeration unit 42 cooling the tetra-aryl ortho silicate in reservoir 43. The cooled tetra-aryl ortho silicate passes from reservoir 43 into tank 47 and is accumulated there.

When the contents of kettle 19 reach the desired temperature, as visibly indicated by thermometers 75, and it is desired to rapidly cool the same, valve 13 is closed and valve 22 left open long enough for pump 26 to clear jacket 18 of heated tetra-aryl ortho silicate. Valve 22 is then closed, motor 63 and pump 62 started and valves 53 and 56 opened. Pump 62 now circulates cooled tetra-aryl ortho silicate from tank 47 through pipe 52 and valve 53 to jacket 18 and out of jacket 18 through pipes 20 and 55, valve 56, pipe 57, valve 58, pipe 59, valve 60 to pump 62 and from pump 62 through pipe 67, valve 68 and pipe 69 to header 70 and tank 47. The contents of kettle 19 are now quickly and efficiently cooled. Should the temperature of the contents of kettle 19 fall below that for which valve 58 is preset bulb 73 will actuate valve 58 to open circulation of the cooled tetra-aryl ortho silicate through by-pass 72 and back to pump 62 by-passing jacket 18 until such time as the temperature of the contents of kettle 19 rises above that for which valve 58 is preset. By-pass 72 will then be closed and cooled tetra-aryl ortho silicate will again be circulated through jacket 18.

It will now be apparent that by the present invention I have provided a novel system and apparatus for heating and cooling kettles in which desired heating and cooling temperatures can be quickly and accurately obtained; which employs tetra-aryl ortho silicate as the heat transfer medium both for heating and for cooling the kettle; which reduces heat losses to a minimum; and which is of simple and inexpensive construction and readily operated by inexperienced personnel.

Changes to or modifications of the embodiment of my invention herein described may now be suggested to those skilled in the art without departing from my inventive concept. Valves 13, 53, 22 and 56 may be actuated automatically from a control panel to prevent operator errors. Further valves 60, 68, 49, and 33 may be suitably adjusted to obtain any desired rates of flow of the tetra-aryl ortho silicate in the several parts of the system. Reference should therefore be had to the appended claims to determine the scope of this invention.

What is claimed is:

In a system and apparatus as described employing tetra-aryl ortho silicate as the heat transfer medium, a jacketed kettle, means for heating the heat transfer medium, closed means for circulating the heated heat transfer medium from said heating means through the jacket of said kettle and returning the heated heat transfer medium from the jacket of said kettle to said heating means, expansion means for the heated heat transfer medium in said circulating means above and adjacent to said heating means including normally closed pressure and vacuum responsive relief means, absorption type refrigerating means including a generator, closed means for circulating heated heat transfer medium from the heating means through said generator and for returning the heat transfer medium from said generator to the heating means, a reservoir receiving cooled transfer medium from said refrigerating means, closed means for circulating cooled transfer medium from said reservoir through the jacket of the kettle and from the jacket of the kettle to said reservoir, thermostatically controlled by-pass means in said first named circulating means and subject to temperatures within the kettle and constructed and arranged so that heated heat transfer medium will be by-passed around the jacket when temperatures within the kettle exceed desired temperatures, valve means in said first named circulating means for terminating the flow of heated heat transfer medium to the jacket when cooled transfer medium is admitted to the jacket, a thermostatically controlled by-pass means in said third named circulating means and subject to temperatures within the kettle and constructed and arranged so that cooled transfer medium will be by-passed around the jacket when temperatures within the kettle fall below desired temperatures, and valve means in said third named circulating means for terminating the flow of transfer medium to the jacket when heated heat transfer medium is admitted to the jacket.

ORION OTTIS OAKS.

REFERENCES CITED

The following references are of record in the file of this patent:

UNITED STATES PATENTS

| Number | Name | Date |
|---|---|---|
| 996,129 | Peck | June 27, 1911 |
| 1,278,067 | McDonald | Sept. 3, 1918 |
| 2,025,937 | Dean | Dec. 31, 1935 |
| 2,121,625 | Crago | June 21, 1938 |
| 2,148,571 | Meyerhoefer | Feb. 28, 1939 |
| 2,257,540 | Smellie | Sept. 30, 1941 |
| 2,275,705 | Wagner | Mar. 10, 1942 |
| 2,335,012 | Johnston | Nov. 23, 1943 |